United States Patent [19]

Johnson et al.

[11] Patent Number: 4,680,866

[45] Date of Patent: Jul. 21, 1987

[54] MAGNETIC FLUX DETECTOR CORRECTION SYSTEM

[75] Inventors: James S. Johnson; Gene A. Albrecht, both of Phoenix, Ariz.

[73] Assignee: Honeywell Inc., Minneapolis, Minn.

[21] Appl. No.: 811,066

[22] Filed: Dec. 19, 1985

[51] Int. Cl.[4] ............................................. G01C 17/38
[52] U.S. Cl. .................................. 33/356; 33/363 Q; 33/361
[58] Field of Search ...................... 33/356, 357, 363 Q, 33/361

[56] References Cited

U.S. PATENT DOCUMENTS

| 3,425,648 | 2/1969 | Wipff et al. | 33/356 |
| 4,006,631 | 2/1977 | Garner | 33/356 |
| 4,024,382 | 5/1977 | Fowler | 33/356 |
| 4,116,057 | 9/1978 | Sullivan | 33/356 |
| 4,262,427 | 4/1981 | Lynch et al. | 33/356 |
| 4,418,480 | 12/1983 | Garner | 33/356 |
| 4,429,469 | 2/1984 | Tsushima et al. | 33/356 |
| 4,539,760 | 9/1985 | Marchent et al. | 33/356 |

Primary Examiner—Willis Little
Attorney, Agent, or Firm—Albin Medved

[57] ABSTRACT

An aircraft heading correction system utilizing the horizontal field strength of the earth's magnetic field to determine the tangent of the dip angle generally associated with a given field strength. The tangent of the dip angle is then used to generate a signal which corrects the flux valve heading during accelerated flight.

6 Claims, 5 Drawing Figures

MAGNETIC FLUX DETECTOR CORRECTION SYSTEM

BACKGROUND OF THE INVENTION

1. Field of the Invention

The present invention relates to magnetic flux detector system for determining aircraft heading and more specifically for a correction system that compensates for heading errors introduced by aircraft acceleration.

2. Description of the Prior Art

Magnetic flux detector systems for determining aircraft heading, commonly called flux valves, are well known in the art. Currently, flux valves provide accurate heading information only during non-accelerated flight. During accelerated flight the pendulous flux valve element is displaced or "hangs-off" the vertical and senses both the earth's horizontal magnetic field and a portion of the earth's vertical magnetic field. Unwanted sensing of the vertical field introduces errors into aircraft heading measurement. Prior art systems simply disengaged the flux valve heading output during periods of accelerated flight that exceeded a predetermined threshold. During periods when the flux valve is disengaged, heading information is obtained from a free gyroscope. As a result, prior art systems have the disadvantage of operating for long periods using only free gyro heading information when aircraft acceleration is above a given threshold. Below the acceleration threshold, flux valve heading errors are still introduced as the aircraft experiences small accelerations. The present invention compensates for flux valve heading errors during periods of low level acceleration thereby increasing flux valve heading accuracy and decreases dependence on obtaining heading information from a free gyro.

SUMMARY

An aircraft heading correction system which corrects the heading error introduced by flux valve hang off. Magnetic heading and horizontal field strength are derived from flux valve output. Tangent of the dip angle is determined from the horizontal field strength and combined with the aircraft's magnetic north and east accelerations to produce a correction signal which is then subtracted from the flux valve deviation angle signal to provide a corrected magnetic heading.

DESCRIPTION OF THE PREFERRED EMBODIMENT

Figure 1:
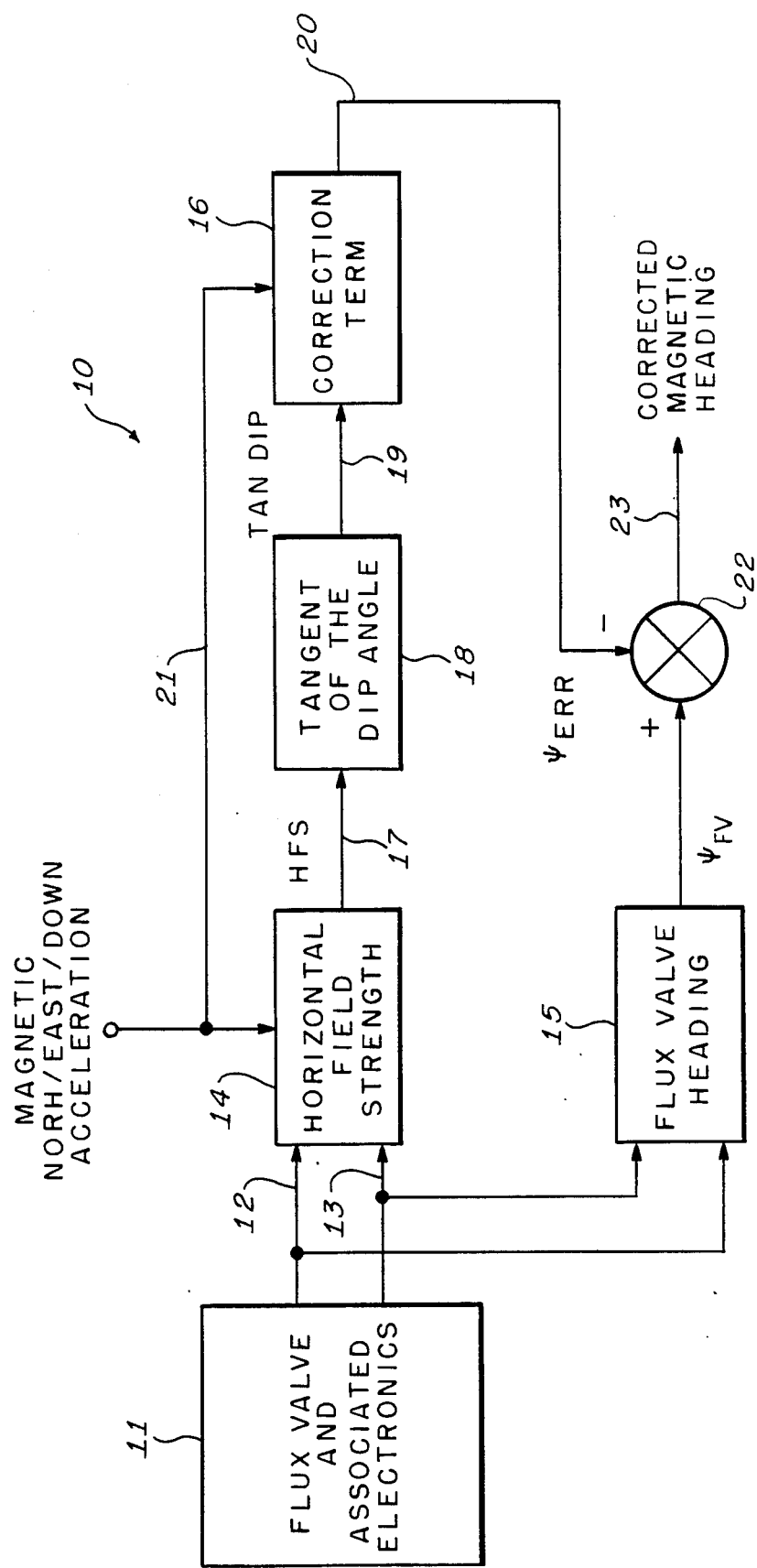
FIG. 1 is a block diagram of the flux valve correction system of the present invention.

To simplify the understanding of the present invention, it will be explained by using a block diagram as shown in FIG. 1. It will be understood that the present invention may be implemented as part of a programmable digital computer.

Referring now to the flux valve hang-off correction system 10 shown in FIG. 1, flux valve 11 and associated circuitry (not shown) provides signals on lines 12 and 13 to horizontal field strength computation block 14 and to flux valve heading block 15.

Flux valve 11 measures magnetic fields which lie parallel to its sensitive axis. The flux valve 11 develops a signal representative of a deviation angle $\psi_{FV}$ from North which is the magnetic heading. Flux valve 11 output may be provided to a programmable digital computer through a current servomechanism and an analog-to-digital converter. Flux valve 11 and associated circuitry output is comprised of signals on lines 12 and 13 consisting respectively of signal $X_1$=field strength $\times$ sine ($\psi_{FV}$) and signal $X_2$=field strength $\times$ cosine ($\psi_{FV}$), where $\psi_{FV}$=eviation angle.

The flux valve 11 sensitive element is pendulously suspended. The horizontal component has a field strength that varies in magnitude according to geographic location near the earth's surface. Since the horizontal component is always aligned with the magnetic north/south grid line, the flux valve output signals 12 and 13 respectively reduces to:

$X_1$=horizontal field strength $\times$ sine (magnetic heading)

$X_2$=horizontal field strength $\times$ cosine (magnetic heading)

Signals representative of values $X_1$ and $X_2$ are provided to horizontal field strength block 14 and raw flux valve heading block 15. Signals representative of magnetic North and East acceleration of the aircraft are provided to horizontal field strength block 14 and correction term block 16. The output of the horizontal field strength block 14 (HFS) appearing on line 17 may be expressed as a signal having the form $$[X_1^2+X_2^2]^{\frac{1}{2}}$$

The output of the flux valve heading block 15 may be expressed as a signal having the form $\text{Tan}^{-1}[X_1/X_2]$. When the invention is implemented by a programmable digital computer, the value of horizontal field strength (HFS) may be maintained by updating its value during period of very low aircraft acceleration through the use, for example, of a five minute time constant single pole filter. A shorter time constant filter, for example, 3 minutes may be used during ground alignment.

The tangent of the dip angle (i.e., the inclination angle at which the magnetic field enters the earth) may be obtained from a horizontal field strength signal on line 17.

The tangent of the dip angle signal (TanDip) appearing on line 19 is calculated by the tangent of the dip angle block 18 utilizing correlation polynomials which relate horizontal field strength to magnetic dip. The magnetic data utilized to develop these polynomials was obtained from Geological Survey Circular 873 and International Geomagnetic Charts and Grid Values (IAGA Bulletin No. 47).

Polynomials have been derived for use in calculating the tangent of the dip angle in block 18. Each polynomial corresponds to a different region on the earth's surface. The polynomials take the following form:

TanDip (represented by the signal on line 19)=$A_0+A_1\times HFS+A_2\times HFS^2+A_3\times HFS^3$ where HFS is the horizontal field strength on line 17 in volts expressed as HFS=Nano Teslas $HFS\times 216.699\times 10^{-6}$.

The correction term block 16 accepts inputs of signals representing tangent of the dip angle on line 19 and the aircraft magnetic North/East acceleration on line 21. The form of the correction term $\psi_{ERR}$ on line 20 will be discussed subsequently.

Figure 2:
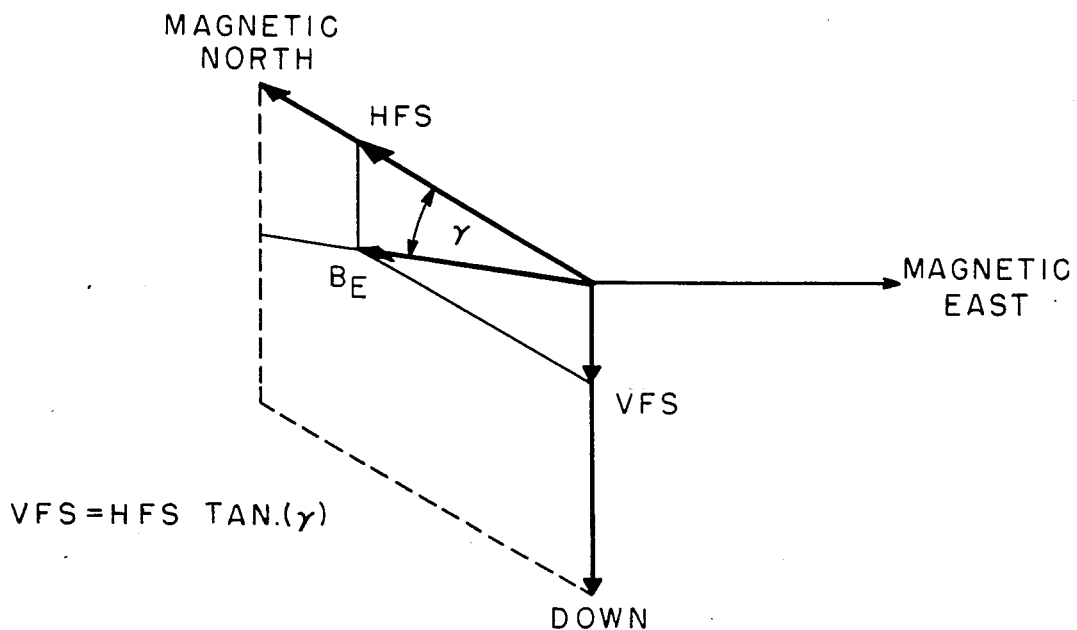
FIG. 2 illustrates resolving the Earth's magnetic field into horizontal and vertical components.

Referring now to FIG. 2. The earth's magnetic field ($B_E$) incident to the north-east down coordinate system has corresponding vector components of horizontal field strength (HFS) and vertical field strength (VFS). The angle between the $B_E$ vector and HFS vector is the dip angle $\gamma$.

When an aircraft accelerates, the pendulous element of flux valve 11 is forced to "hang-off" to an angle approximately equal to the inverse tangent of the aircraft horizontal acceleration divided by the down acceleration.

Figure 3:
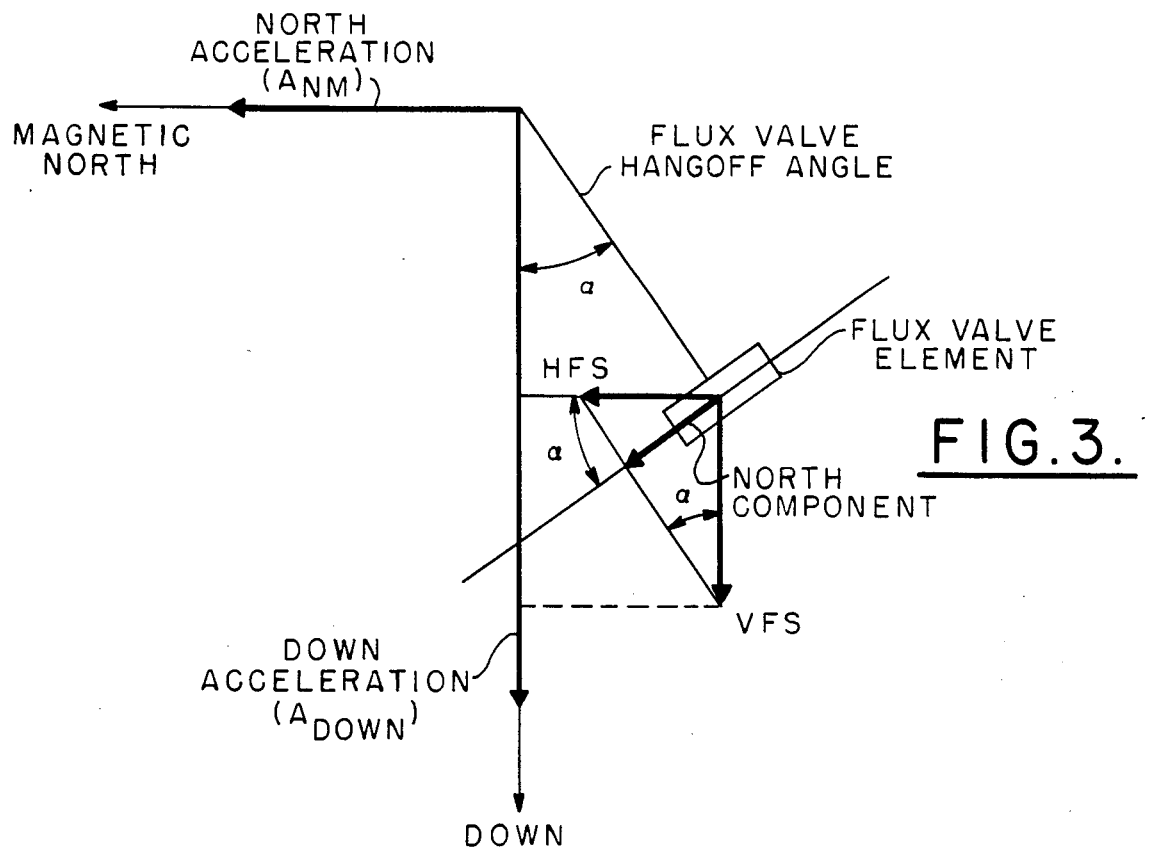
FIGS. 3 and 3A illustrate the flux valve hang off angles.
Figure 3A:
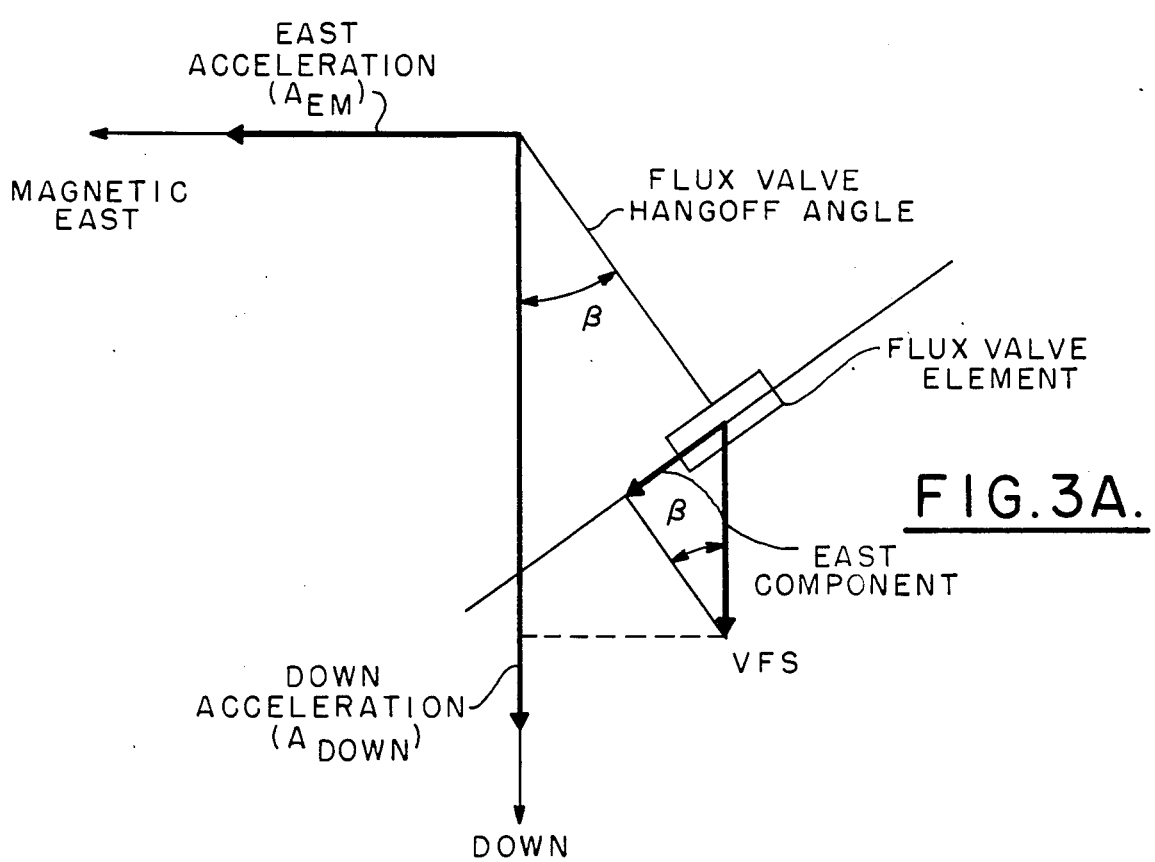

Referring now to FIGS. 3 and 3A, aircraft accelerations are resolved into horizontal components along the approximate magnetic north (FIG. 3) and east (FIG. 3A) coordinates through direction cosines. FIGS. 3 and 3A illustrate the resulting flux valve hang-off angles $\alpha$ and $\beta$ due to north and east acceleration, respectively. The corresponding signals representative of magnetic north and east field strength measurements may be defined as follows:

North component = [tan ($\gamma$) × sine ($\alpha$) + cos ($\alpha$)]

East component = [tan ($\gamma$) × sin ($\beta$)]

Where
$\alpha = \tan^{-1}(A_{NM}/A_{DOWN})$, $\beta = \tan^{-1}(A_{EM}/A_{DOWN})$
Where
$A_{NM}$ = aircraft Magnetic North acceleration,
$A_{EM}$ = aircraft Magnetic East acceleration and
$A_{DOWN}$ = aircraft Down acceleration.

Figure 4:
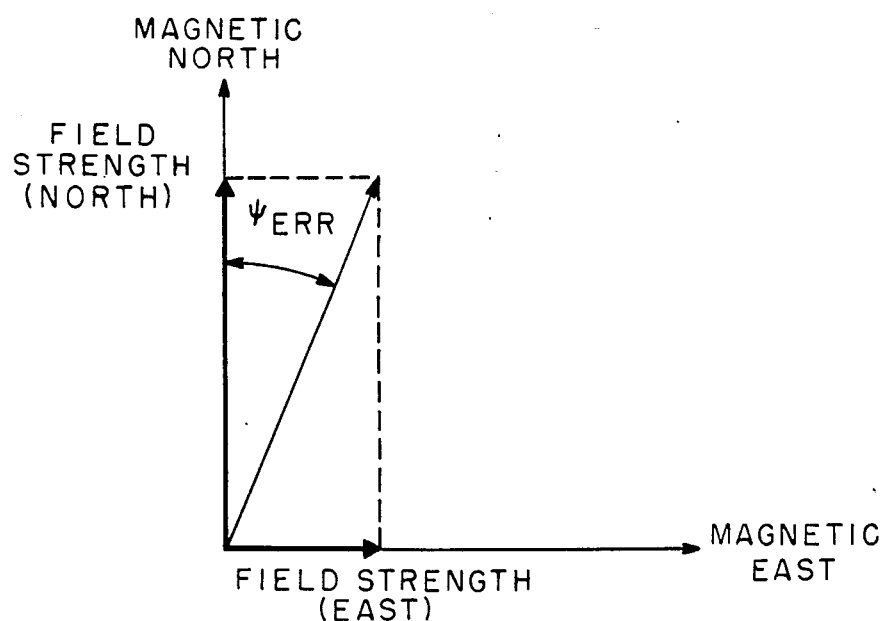
FIG. 4 illustrates heading error in terms of north/east field strength vectors.

Since HFS is defined to be north, any east component results in a heading error as shown in FIG. 4 which is equal to:

Flux Valve Heading Error = $\tan^{-1}$ [east component/north component]

or $\psi_{ERR} = \tan^{-1}[\tan(\gamma)\sin(\beta)/\tan(\gamma)\sin(\alpha)+\cos(\alpha)]$ Referring again to FIG. 1, correction term block 16 provides the correction term signal $\psi_{ERR}$ on line 20. $\psi_{ERR}$ is subtracted from deviation angle $\psi_{FV}$ in subtraction block 22 during small aircraft accelerations. The output of subtraction block 22 on line 23 is the corrected magnetic heading.

While the invention has been described in its preferred embodiments, it is to be understood that the words which have been used are words of description rather than limitation that that changes may be made within the purview of the appended claims without departing from the true scope and spirit of the invention in its broader aspects.

We claim:

1. An aircraft heading correction system of the type utilizing a magnetic flux detector to provide a signal as a function of magnetic heading of said aircraft, said correction system comprising:

a first means, configured to accept:

(a) a signal representative of north, east and down acceleration components of said aircraft, (b) said signal as a function of magnetic heading of said aircraft, for providing a signal representative of horizontal field strength, a second means, configured to accept said signal representative of horizontal field strength, for providing said signal representative of horizontal field strength and a signal representative of the tangent of a dip angle, a third means, configured to accept said signal as a function of magnetic heading of said aircraft, for providing a magnetic heading signal, a fourth means, configured to accept:

(a) said signal representative of horizontal field strength, (b) said signal representative of the tangent of a dip angle, (c) said signal representative of north, east and down acceleration components of said aircraft, for providing a magnetic heading correction signal, and a fifth means, configured to accept said magnetic heading correction signal and said magnetic heading signal for providing a corrected magnetic heading signal.

2. An aircraft heading correction system according to claim 1 wherein said signal as a function of magnetic heading of said aircraft comprises a first and second signal having the relationship:

said first signal = $X_1$ = horizontal field strength × sine (magnetic heading)

said second signal = $X_2$ = horizontal field strength × cosine (magnetic heading).

3. A system according to claim 2 wherein said signal representative of horizontal field strength has the form horizontal field strength = $[X_1^2 + X_2^2]^{\frac{1}{2}}$.

4. A system according to claim 2 wherein said third means provides a magnetic heading sigal having the form $\tan^{-1}[X_1/X_2]$.

5. A system according to claim 3 wherein said signal representative of the tangent of a dip angle is of the form tangent of
Dip = $A_0 + A_1 \times HFS + A_2 \times HFS^2 + A_3 \times HFS^3$ where
$A_0$, $A_1$, $A_2$ and $A_3$ are predetermined constants
HFS = horizontal field strength.

6. A system according to claim 5 wherein said magnetic heading correction signal is of the form:

$\tan^{-1} \dfrac{[\text{east component}]}{\text{north component}}$ where
east component = [tan (dip angle) × sin $A_{EM}/A_{DOWN}$)],
north component = [tan (dip angle × sin ($A_{NM}/A_{DOWN}$)] + cos ($A_{NM}/A_{DOWN}$)],
$A_{EM}$ = aircraft east acceleration,
$A_{NM}$ = aircraft north acceleration,
$A_{DOWN}$ = aircraft down acceleration.

* * * * *